(12) United States Patent
Kirinoe

(10) Patent No.: US 6,744,723 B2
(45) Date of Patent: Jun. 1, 2004

(54) GUIDE SHAFT SUPPORT MECHANISM AND RECORDING MEDIUM RECORDING AND REPRODUCING APPARATUS

(75) Inventor: Yoshiki Kirinoe, Tokyo (JP)

(73) Assignee: Teac Corporation, Tokyo (JP)

( * ) Notice: Subject to any disclaimer, the term of this patent is extended or adjusted under 35 U.S.C. 154(b) by 146 days.

(21) Appl. No.: 09/840,849

(22) Filed: Apr. 24, 2001

(65) Prior Publication Data

US 2001/0036146 A1 Nov. 1, 2001

(30) Foreign Application Priority Data

Apr. 28, 2000 (JP) ........................................ 2000-130037

(51) Int. Cl.$^7$ .............................................. G11B 17/30
(52) U.S. Cl. ..................................... 369/249; 360/267.2
(58) Field of Search ............................... 369/249, 219, 369/220, 44.21, 215, 244, 255; 360/266.2, 266.6, 267.6, 267.2

(56) References Cited

U.S. PATENT DOCUMENTS

| | | | | |
|---|---|---|---|---|
| 5,278,820 A | * | 1/1994 | Shtipelman | 369/215 |
| 5,432,772 A | * | 7/1995 | Yamamoto | 369/219 |
| 5,745,470 A | * | 4/1998 | Nagai et al. | 369/219 |
| 5,912,789 A | * | 6/1999 | Konno et al. | 369/219 |
| 6,091,579 A | * | 7/2000 | Suzuki | 369/247 |
| 6,144,533 A | | 11/2000 | Fukuda et al. | |
| 6,175,545 B1 | * | 1/2001 | Akama et al. | 369/219 |
| 6,304,537 B1 | * | 10/2001 | Seo et al. | 369/53.45 |
| 6,307,829 B1 | * | 10/2001 | Inoue et al. | 369/219 |
| 6,314,076 B1 | * | 11/2001 | Arai et al. | 369/244 |
| 6,396,794 B1 | * | 5/2002 | Tsugami et al. | 369/223 |
| 6,449,238 B2 | * | 9/2002 | Furukawa et al. | 369/178.01 |

FOREIGN PATENT DOCUMENTS

| | | |
|---|---|---|
| JP | 8-315521 A | 11/1996 |
| JP | 10-112122 A | 4/1998 |

* cited by examiner

*Primary Examiner*—Brian E. Miller
(74) *Attorney, Agent, or Firm*—Anderson Kill & Olick, P.C.; Eugene Lieberstein; Michael N. Meller

(57) ABSTRACT

A guide shaft support mechanism for supporting a guide shaft on a base includes first and second parts supporting first and second ends of the guide shaft, respectively, and a third part connecting said first and second parts. The first through third parts are formed integrally with one another. The guide shaft guides a moving body in a given direction.

13 Claims, 11 Drawing Sheets

GUIDE SHAFT SUPPORT MECHANISM AND RECORDING MEDIUM RECORDING AND REPRODUCING APPARATUS

BACKGROUND OF THE INVENTION

1. Field of the Invention

The present invention generally relates to guide shaft support mechanisms and recording medium recording and reproducing apparatuses, and more particularly to a guide shaft support mechanism and a recording medium recording and reproducing apparatus which facilitate attachment of support members for supporting guide shafts.

2. Description of the Related Art

A recording and reproduction apparatus for a disk recording medium, for instance, includes an optical head for reading information from or writing information to a recording surface of the disk recording medium rotated on a turntable. The optical head is movable in a radial direction of the disk recording medium, being guided by a pair of guide shafts mounted on a base.

In guide shaft support mechanisms for supporting guide shafts of this kind, the guide shafts are positioned by fixing to the base support parts for supporting the end portions of the guide shafts. If the guide shafts are mounted in positions deviating from correct positions, a direction in which the optical head is moved with respect to the disk recording medium deviates from the right direction so that a laser beam emitted from the optical head is prevented from accurately tracing tracks formed on the disk recording medium. The attachment accuracy of the support parts for supporting the guide shafts is therefore important.

However, according to the conventional guide shaft support mechanisms, the guide shafts are positioned on the base with the end portions thereof being fitted into the support parts. Therefore, each of the four support parts should be positioned and mounted on the base in an assembly process. However, since the four support parts are similar to one another in shape, the four support parts are often confused with one another. This requires workers to be careful not to confuse the four parts with one another, thus requiring time in assembly.

SUMMARY OF THE INVENTION

It is a general object of the present invention to provide a guide shaft support mechanism and a recording medium recording and reproducing apparatus in which the above-described disadvantage is eliminated.

A more specific object of the present invention is to provide a guide shaft support mechanism and a recording medium recording and reproducing apparatus which facilitate respective assembly processes.

The above objects of the present invention are achieved by a guide shaft support mechanism for supporting a guide shaft on a base, the guide shaft guiding a moving body in a given direction, which mechanism includes first and second parts supporting first and second ends of the guide shaft, respectively, and a third part connecting the first and second parts, wherein the first through third parts are formed integrally with one another.

According to the above-described mechanism, the first and second parts are prevented from being apart from each other. Therefore, the first and second parts are prevented from being confused in a mounting process, thus facilitating the mounting process.

Additionally, the third part has a flexible end portion bent in a U-shape. Further, the flexible end portion deforms to absorb a deviation of a position of the first part relative to that of the second part in mounting the first and second parts on the base.

According to the guide shaft support mechanism having the above-described structure, if the positions of the first and second parts are deviated relative to each other, the one end portion of the third part deforms to absorb the deviation. Therefore, the first and second parts are accurately mounted on the base.

The above objects of the present invention are also achieved by a recording and reproduction apparatus for a recording medium, which apparatus includes a head for writing data on and reading data from the recording medium, a pair of guide shafts for guiding the head so that the head is freely movable in a given direction, a base including first and second parts for positioning first and second ends of the guide shafts, and a pair of guide shaft support members including first and second support parts for supporting the first and second ends of the guide shafts, respectively, and first and second engagement parts engaging the first and second parts of the base, respectively, wherein the first and second support parts and the first and second engagement parts of each of the guide shaft support members are integrally formed.

According to the above-described apparatus, the first and second support parts are prevented from being apart from each other. Therefore, the first and second support parts are prevented from being confused in a mounting process, thus facilitating the mounting process.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 1:
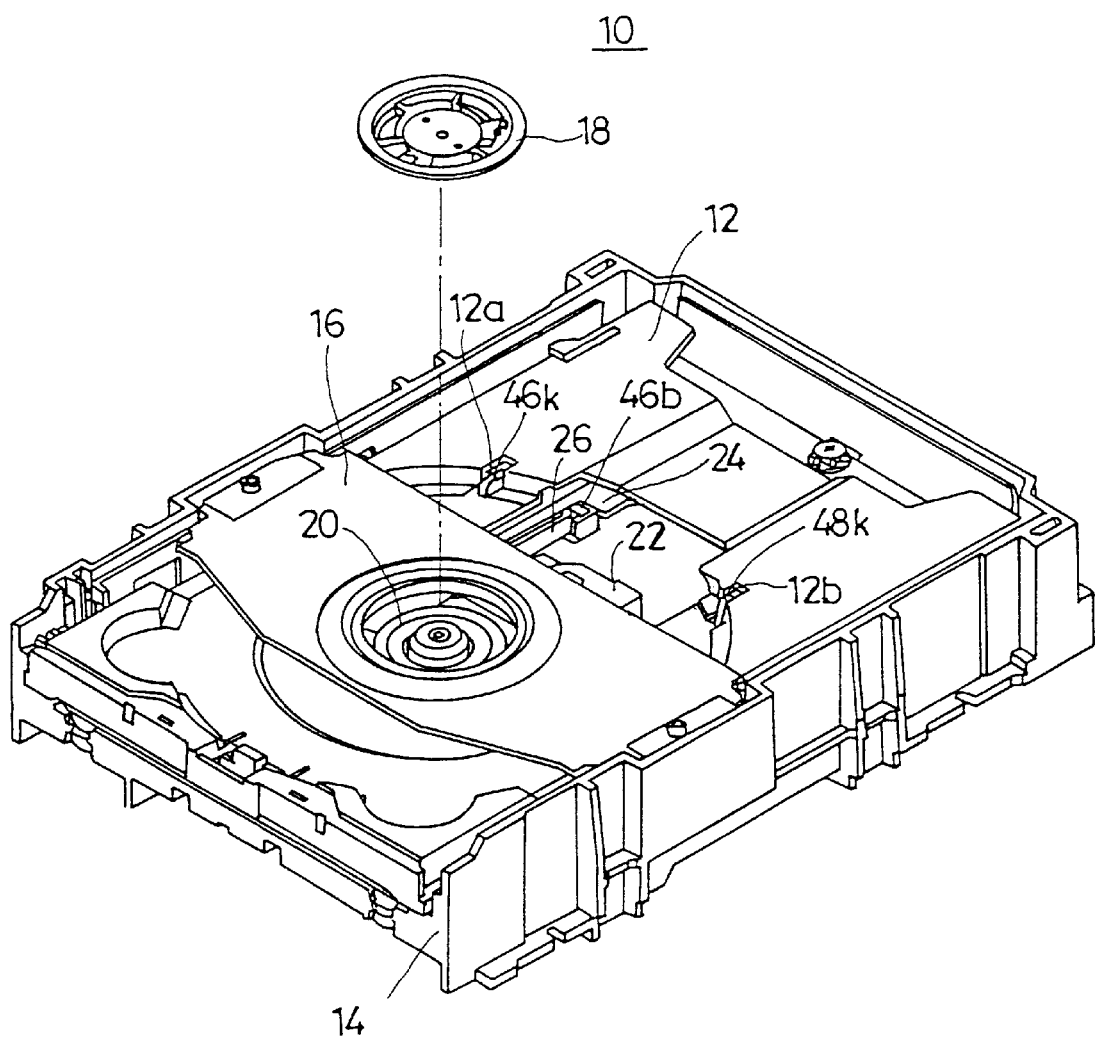
FIG. 1 is a perspective view of a recording medium recording and reproducing apparatus employing first and second guide shaft support mechanisms according to an embodiment of the present invention.

FIG. 1 is a perspective view of a recording medium recording and reproducing apparatus 10 employing first and second guide shaft support mechanisms 30 and 32 according to the embodiment of the present invention.

As shown in FIG. 1, the recording medium recording and reproducing apparatus 10, which is a disk drive for an erasable optical disk such as a CD-RW, includes a tray 12 on which a disk recording medium (not shown) is placed, a frame 14 supporting the tray 12 so that the tray 12 is slidable in a longitudinal direction of the frame 14, a damper holder 16 laid across the side walls of the frame 14, a damper 18 supported swingably in the center of the damper holder 16, a turntable 20 clamping the disk recording medium with the damper 18, an optical head 22 optically reading or writing information, and a movable base 24 provided below the tray 12 to be movable in upward and downward directions.

The movable base 24 is rotationally moved downward when the tray 12 is ejected from the frame 14, and is rotationally moved upward when the tray 12 is inserted into the frame 14.

The disk recording medium placed on the tray 12 is placed on the turntable 20 by the rotational upward movement of the turntable 20 to be clamped by the clamper 18.

Figure 2:
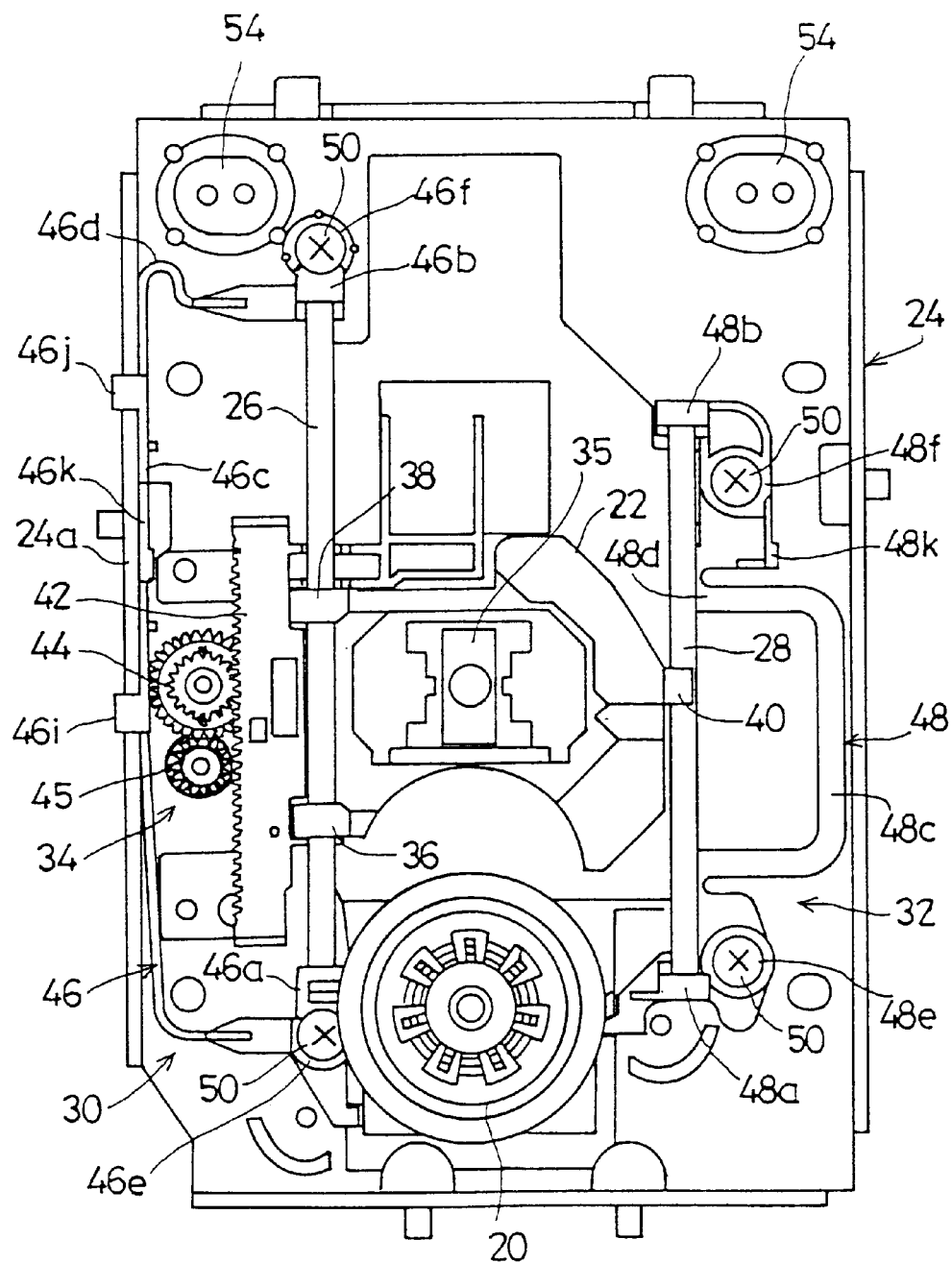
FIG. 2 is a top plan view of a movable base of the recording medium recording and reproducing apparatus of FIG. 1.

FIG. 2 is a top plan view of the movable base 24.

As shown in FIG. 2, the turntable 20 and the optical head 22 are mounted on the movable base 24. Further, first and second guide shafts 26 and 28 for guiding the optical head 22, the first and second guide shaft support mechanisms 30 and 32 for supporting the first and second guide shafts 26 and 28, respectively, and a drive mechanism 34 for driving the optical head 22 are provided on the movable base 24.

The optical head 22 has a pickup 35 emitting a laser beam provided in its center, bearing parts 36 and 38 slidably engaging the first guide shaft 26, and a bearing part 40 slidably engaging the second guide shaft 28. The optical head 22 further has a rack 42 for the drive mechanism 34, a pinion 44 engaging the rack 42, and a motor drive gear 45 for driving the pinion 44 provided on its side face on the side of the first guide shaft 26.

When the motor drive gear 45 is rotated, the pinion 44 is rotated to move the rack 42 along the length of the first guide shaft 26. By this movement, the optical head 22 joined to the rack 42 is moved in a radial direction of the disk recording medium with the sides of the optical head 22 being guided by the first and second guide shafts 26 and 28.

The first and second guide shaft support mechanisms 30 and 32 includes first and second support members 46 and 48 for supporting first and second ends of the first and second guide shafts 26 and 28, respectively, and mounting screws 50 for fixing the first and second support members 46 and 48 to the movable base 24.

A description will now be given of the first and second support members 46 and 48.

Figure 3A:
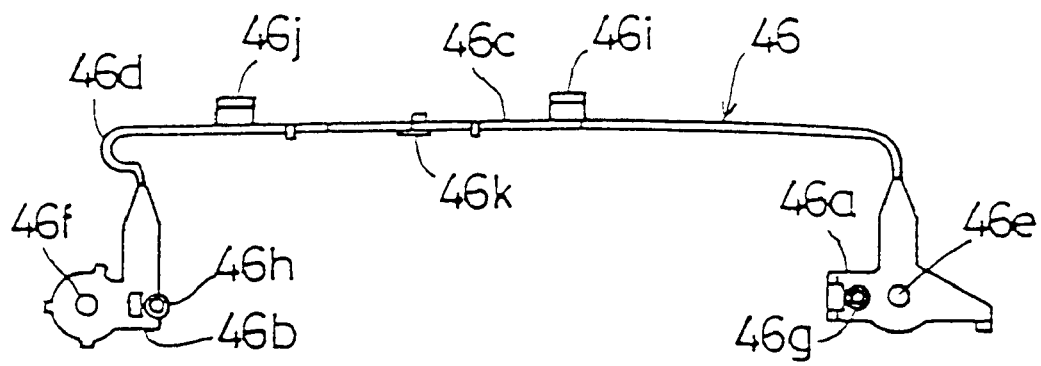
FIGS. 3A through 3G are a bottom view, an upside down rear view, a top plan view, a side view, a reverse side view to the side view of FIG. 3D, a front view, and a sectional view taken along the line A—A of FIG. 3C of a first support member of the recording medium recording and reproducing apparatus of FIG. 1, respectively.
Figure 3B:
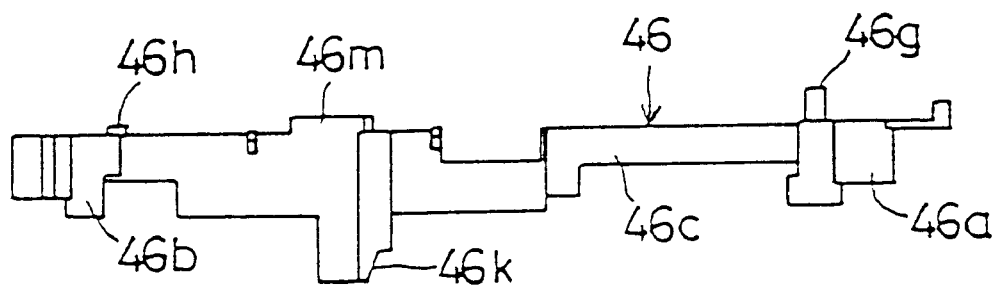
Figure 3C:
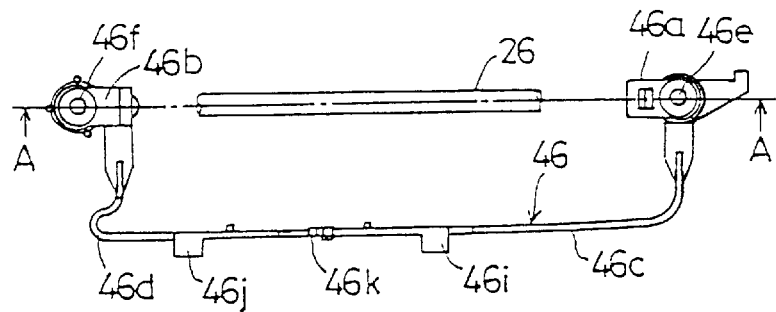
Figure 3D:
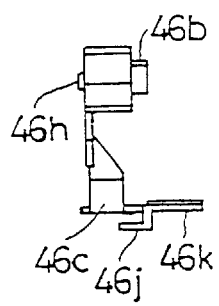
Figure 3E:
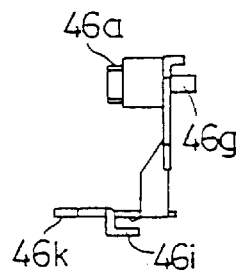
Figure 3F:
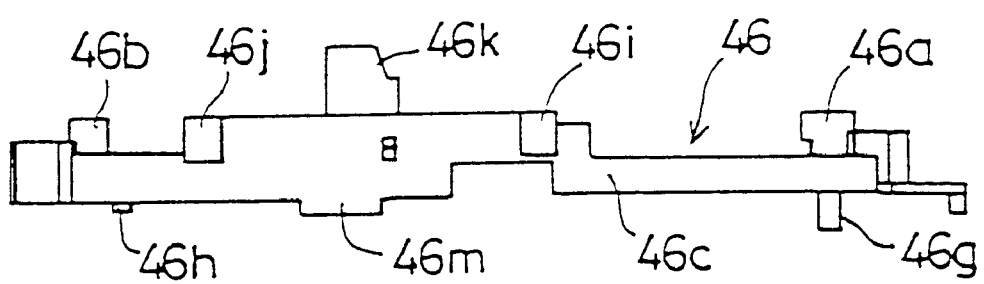
Figure 3G:
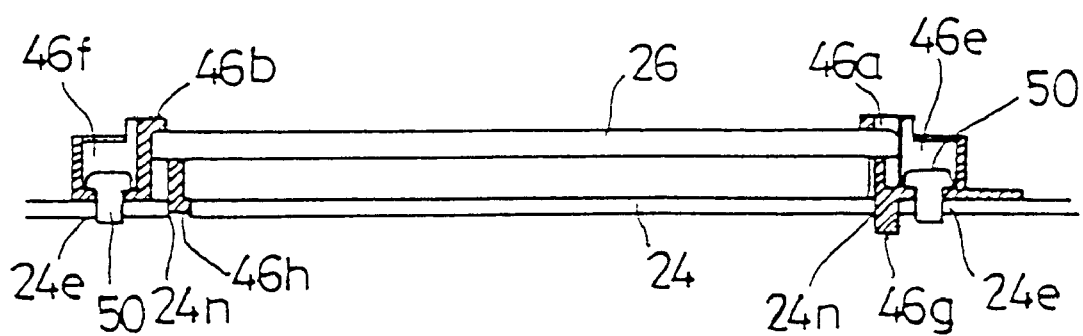

FIGS. 3A through 3G are a bottom view, an upside down rear view, a top plan view, a side view, a reverse side view to the side view of FIG. 3D, a front view, and a sectional view taken along the line A—A of FIG. 3C of the first support member 46, respectively, for illustrating a shape thereof.

As shown in FIGS. 3A through 3G, the first support member 46 has a first support part 46a for supporting the first end of the first guide shaft 26, a second support part 46b for supporting the second end of the first guide shaft 26, and a connection part 46c connecting the first and second support parts 46a and 46b integrally formed. The connection part 46c is curved to have an angular C-shape and has one end portion thereof formed to have flexibility. This portion is referred to as a flexible part 46d.

If the positions of the first and second support parts 46a and 46b are deviated relative to each other in mounting the first support member 46 on the movable base 24, the flexible part 46d deforms to absorb the deviation.

Through holes 46e and 46f for letting through the mounting screws 50 are formed in close proximity to the first and second support parts 46a and 46b. Further, positioning pins 46g and 46h protrude from the bottoms of the first and second support parts 46a and 46b, respectively, to fit into positioning holes 24n formed in the movable base 24 to restrict the mounting positions of the first and second support parts 46a and 46b. Hooks 46i and 46j engaging an edge part 24a of the movable base 24 are provided on the front side of the connection part 46c.

The first and second support parts 46a and 46b are positioned on the movable base 24 by the positioning pins 46g and 46h, respectively, and the connection part 46c is joined to the edge part 24a of the movable base 24 by the hooks 46i and 46j. The middle portion of the first support member 46 is positioned by fitting a projection 46m formed on the middle portion into a concave part 24m formed in the movable base 24.

A placement position restriction part 46k protrudes upward from the connection part 46c so as to restrict the placement position of the disk recording medium by contacting the periphery of the disk recording medium placed on the tray 12. As shown in FIG. 1, the placement position restriction part 46k is inserted into an opening 12a of the tray 12 to contact the periphery of the disk recording medium. This reduces the number of components compared with a case where the placement position restriction part 46k is separately provided.

Figure 4A:
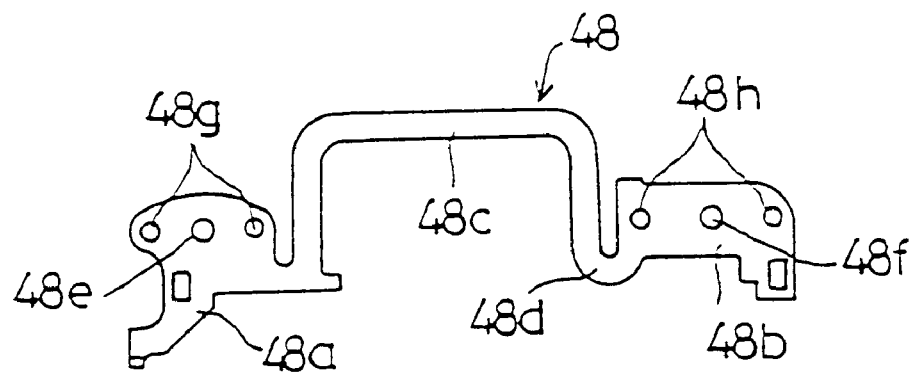
FIGS. 4A through 4I are a bottom view, an upside down rear view, a top plan view, a side view, a reverse side view to the side view of FIG. 4D, a sectional view taken along the line A—A of FIG. 4C, a sectional view taken along the line B—B of FIG. 4C, a sectional view taken along the line C—C of FIG. 4C, and a sectional view taken along the line D—D of FIG. 4C of a second support member of the recording medium recording and reproducing apparatus of FIG. 1, respectively.
Figure 4B:
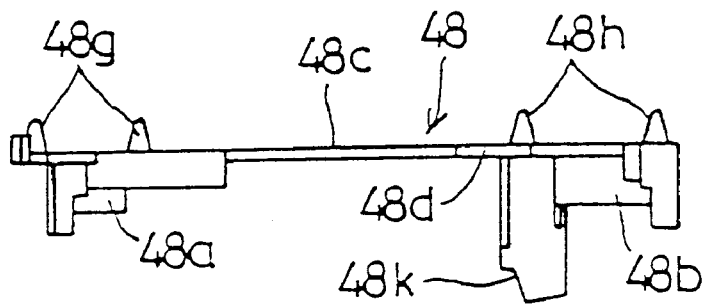
Figure 4C:
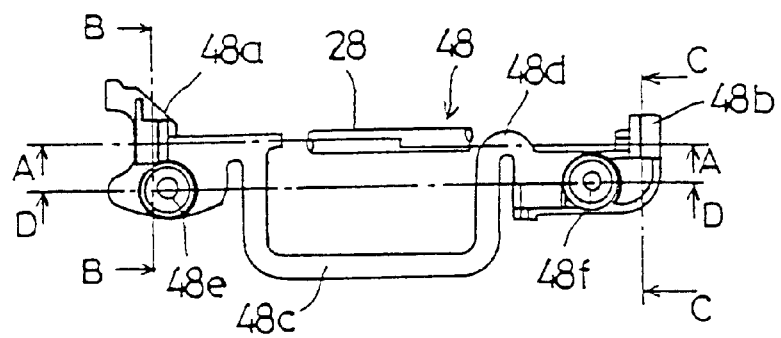
Figure 4D:
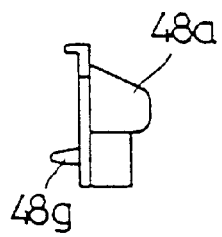
Figure 4E:
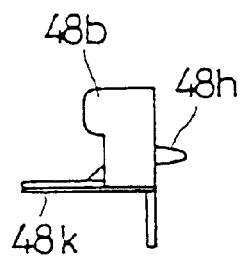
Figure 4F:
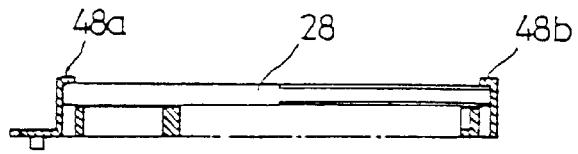
Figure 4G:
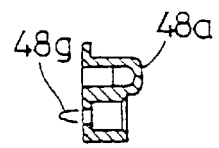
Figure 4H:
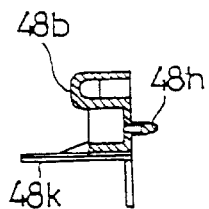
Figure 4I:
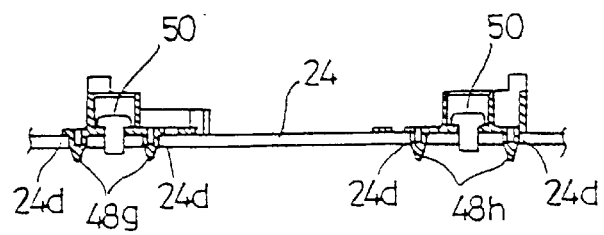

FIGS. 4A through 4I are a bottom view, an upside down rear view, a top plan view, a side view, a reverse side view to the side view of FIG. 4D, a sectional view taken along the line A—A of FIG. 4C, a sectional view taken along the line B—B of FIG. 4C, a sectional view taken along the line C—C of FIG. 4C, and a sectional view taken along the line D—D of FIG. 4C of the second support member 48, respectively, for illustrating a shape thereof.

As shown in FIGS. 4A through 4I, the second support member 48 has a first support part 48a for supporting the first end of the second guide shaft 28, a second support part 48b for supporting the second end of the second guide shaft 28, and a connection part 48c connecting the first and second support parts 48a and 48b integrally formed. The connection part 48c is curved to have an angular C-shape and has one end portion thereof formed to have flexibility. This portion is referred to as a flexible part 48d.

If the positions of the first and second support parts 48a and 48b are deviated relative to each other in mounting the first support member 46 on the movable base 24, the flexible part 48d deforms to absorb the deviation.

Through holes 48e and 48f for letting through the mounting screws 50 are formed in close proximity to the first and second support parts 48a and 48b. Further, positioning pins 48g and 48h protrude from the bottoms of the first and second support parts 48a and 48b, respectively, to fit into positioning holes 24d formed in the movable base 24 to restrict the mounting positions of the first and second support parts 48a and 48b.

A placement position restriction part 48k protrudes upward from the connection part 48c so as to restrict the placement position of the disk recording medium by contacting the periphery of the disk recording medium placed on the tray 12. As shown in FIG. 1, the placement position restriction part 48k is inserted into an opening 12b of the tray 12 to contact the periphery of the disk recording medium. This reduces the number of components compared with a case where the placement position restriction part 48k is separately provided.

A description will now be given of a mounting process of the first and second support parts 48a and 48b of the second support member 48.

Figure 5:
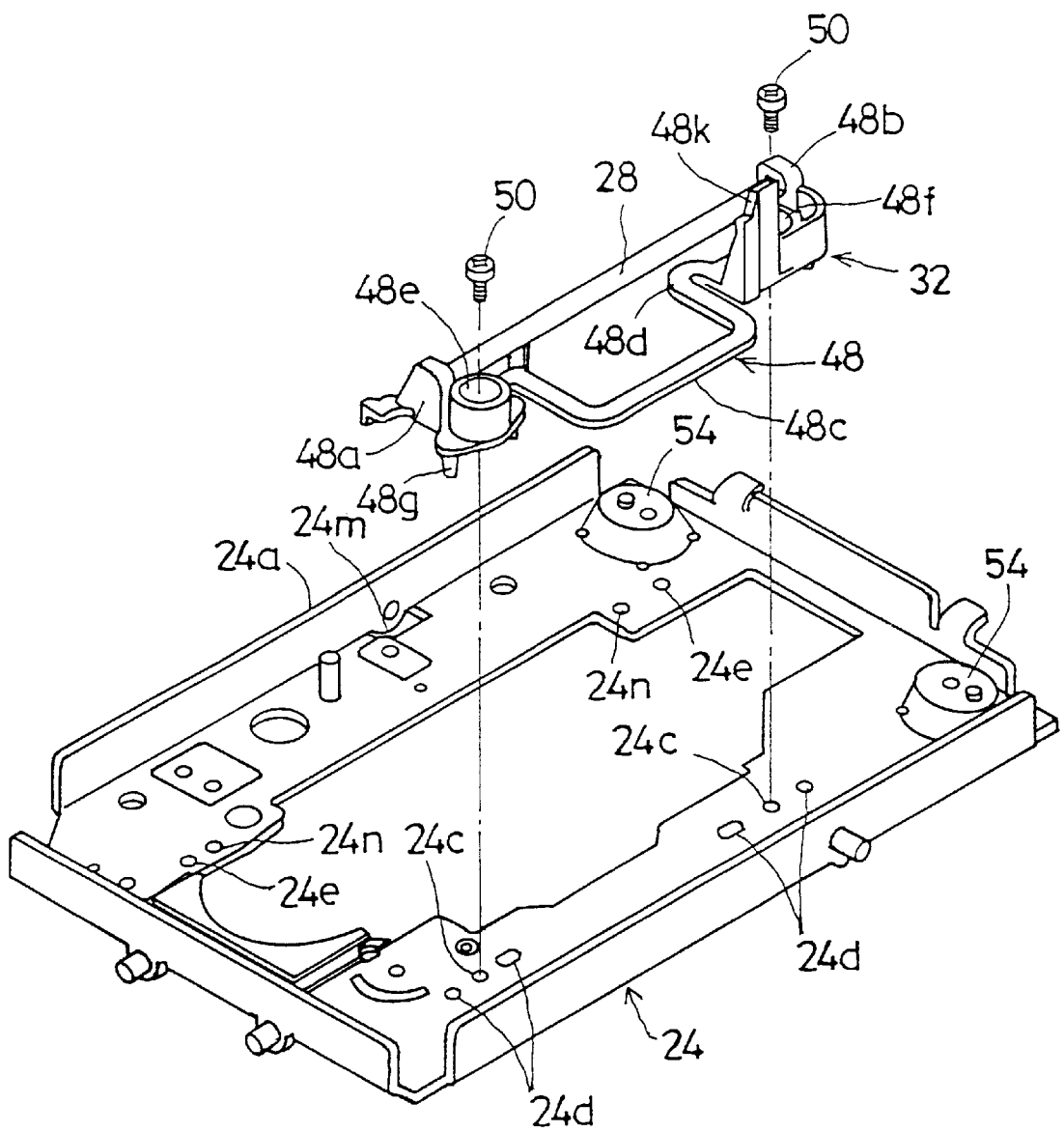
FIG. 5 is a diagram for illustrating a mounting process of a second guide shaft and the second support member of the recording medium recording and reproducing apparatus of FIG. 1.

FIG. 5 is a diagram for illustrating a mounting process of the second guide shaft 28 and the second support member 48.

As shown in FIG. 5, the second guide shaft 28 has its first end fitted into the first support part 48a of the second support member 48 and its second end fitted into the second support part 48b of the second support member 48. Thereby, the second guide shaft 28 is kept laid between the first and second support parts 48a and 48b.

At this point, the first and second support parts 48a and 48b are connected deformably by the connection part 48c. Therefore, the first and second support parts 48a and 48b are prevented from being confused and assembly efficiency is improved compared with a case where the first and second support parts 48a and 48b are separately mounted on the movable base 24.

Next, the second support member 48 is positioned by fitting the positioning pins 48g and 48h protruding from the bottoms of the first and second support parts 48a and 48b into the positioning holes 24d formed in the movable base 24 with the first and second ends of the second guide shaft 28 being fitted into the first and second support parts 48a and 48b, respectively. At this point, a positioning operation is not hindered by the connection part 48c connecting the first and second support parts 48a and 48b since the connection part 48c is deformable.

Then, the first and second support parts 48a and 48b are fastened to the movable base 24 with the mounting screws 50 passing through the through holes 48e and 48f to be threaded into screw holes 24c of the movable base 24. Thereby, the second support member 48 supporting the second guide shaft 28 is mounted in a predetermined mounting position on the movable base 24.

Figure 6:
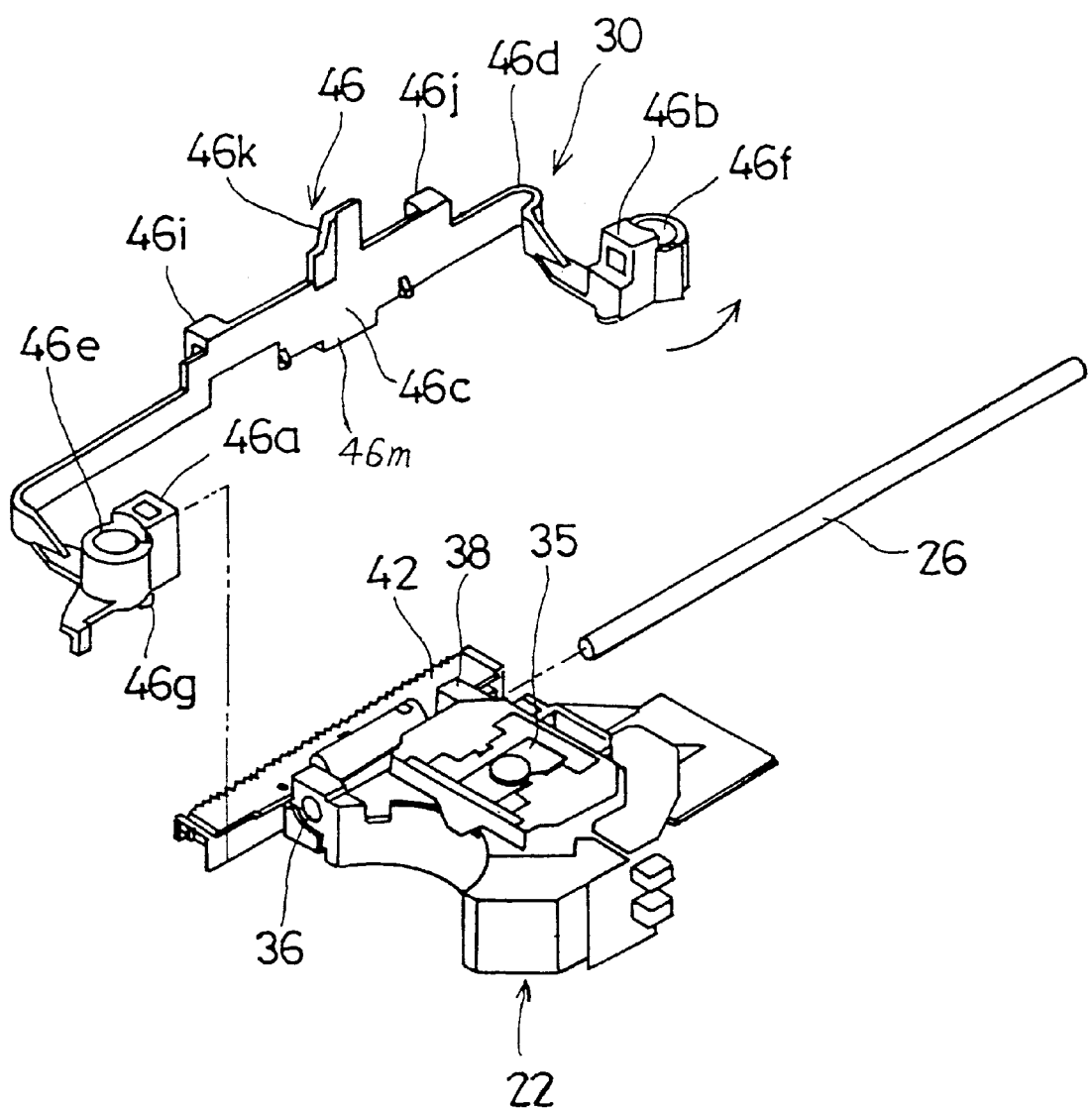
FIG. 6 is a diagram for illustrating a mounting process of a first guide shaft, the first support member, and an optical head of the recording medium recording and reproducing apparatus of FIG. 1.

FIG. 6 is a diagram for illustrating a mounting process of the first guide shaft 26, the first support member 46, and the optical head 22.

As shown in FIG. 6, the first guide shaft 26 is inserted into the bearing parts 36 and 38 of the optical head 22. Thereafter, the first end of the first guide shaft 26 is fitted into the first support part 46a of the first support member 46, and then the flexible part 46d is deformed so that the second end of the first guide shaft 26 is fitted into the second support part 46b of the first support member 46. Thereby, the first guide shaft is kept laid between the first and second support parts 46a and 46b.

At this point, the first and second support parts 46a and 46b are connected deformably by the connection part 46c. Therefore, the first and second support parts 46a and 46b are prevented from being confused and assembly efficiency is improved compared with a case where the first and second support parts 46a and 46b are separately mounted on the movable base 24.

Figure 7:
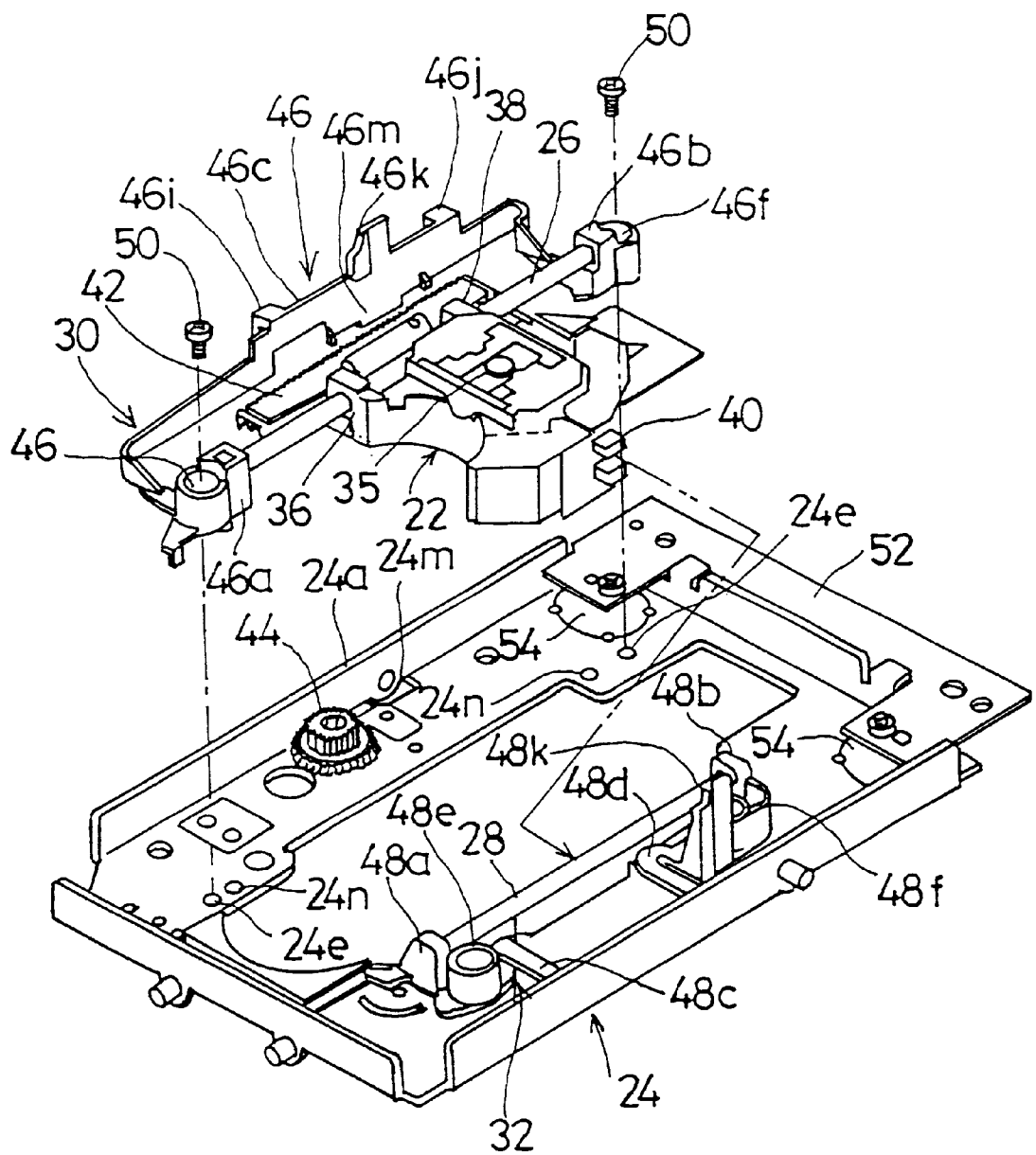
FIG. 7 is another diagram for illustrating the mounting process of the first guide shaft, the first support member, and the optical head.

FIG. 7 is another diagram for illustrating the mounting process of the first guide shaft 26, the first support member 46, and the optical head 22.

As shown in FIG. 7, a leaf spring 52 for supporting the movable base 24 is screwed to mounting parts 54 formed on the movable base 24. Next, the first support member 46 is positioned by fitting the positioning pins 46g and 46h protruding from the bottoms of the first and second support parts 46a and 46b into the positioning holes 24n formed in the movable base 24 with the first and second ends of the first guide shaft 26 being fitted into the first and second support parts 46a and 46b, respectively. The hooks 46i and 46j provided on the connection part 46c engage the edge part 24a of the movable base 24 and the projection 46m is fitted into the concave part 24m so that the connection part 46c is fixed to the movable base 24 so as not to interfere with other components. At this point, a positioning operation is not hindered by the connection part 46c connecting the first and second support parts 46a and 46b since the connection part 46c is deformable.

Then, the first and second support parts 46a and 46b are fastened to the movable base 24 with the mounting screws 50 passing through the through holes 46e and 46f to be threaded into screw holes 24e of the movable base 24. Thereby, the first support member 46 supporting the first guide shaft 26 is mounted in a predetermined mounting position on the movable base 24.

In this embodiment, the description has been given of a mechanism for supporting guide shafts for guiding an optical head. However, the present invention is not limited to the specifically disclosed embodiment, but variations and modifications may be made without departing from the scope of the present invention. For instance, the present invention is also applicable to a mechanism for guiding a head of another recording method such as a magnetic recording.

The present application is based on Japanese priority patent application No. 2000-130037 filed on Apr. 28, 2000, the entire contents of which are hereby incorporated by reference.

What is claimed is:

1. A guide shaft support mechanism for supporting a guide shaft on a movable base, the guide shaft guiding a moving body in a given direction, said guide shaft support mechanism comprising:

first and second parts connected to said movable base in a predetermined alignment relative to one another for supporting and maintaining first and second opposite ends of the guide shaft in said alignment; and a third part interconnecting said first and second parts at said opposite ends of said guide shaft, wherein said first through third parts are formed integral with one another to define a single integral unit for supporting and maintaining the predetermined alignment of said guide shaft on said movable base with the third part and guide shaft being different members.

2. The guide shaft support mechanism as claimed in claim 1, wherein said third part has a flexible end portion bent in a U-shape at a location such that any deviation in said alignment resulting from mounting the third part causes said flexible end portion to absorb the deviation.

3. The guide shaft support mechanism as claimed in claim 2, wherein said flexible end portion is deformable, by a force applied in mounting said first and second parts on the base, so as to absorb a deviation of a position of said first part relative to that of said second part.

4. The guide shaft support mechanism as claimed in claim 1, wherein each of said first and second parts comprises an engagement part which is positioned in a predetermined position on the base.

5. The guide shaft support mechanism as claimed in claim 4, wherein said engagement part is a pin.

6. The guide shaft support mechanism as claimed in claim 1, wherein said third part comprises an engagement part which engages the base so that said third part is fixed thereto.

7. The guide shaft support mechanism as claimed in claim 6, wherein said engagement part is a hook.

8. A recording and reproducing apparatus for a recording medium, comprising:
- a head for writing data on and reading data from the recording medium;
- a pair of guide shafts for guiding said head so that said head is freely movable in a given direction;
- a base including first and second positioning parts for supporting and holding first and second opposed ends of said guide shafts in alignment; and
- a pair of guide shaft support members for interconnecting the first and second ends of said guide shafts, respectively, with said guide shaft support members including first and second support parts and first and second engagement parts for engaging said first and second positioning parts of the base, respectively, wherein the first and second support parts and the first and second engagement parts of each of said guide shaft support members are integrally formed.

9. The recording and reproduction apparatus as claimed in claim 8, wherein said first and second support parts of each of said guide shaft support members are connected by a connection part at each of said first and second end of each of said guide shafts respectively with said connection part being formed as a single integral unit with said first and second parts respectively.

10. The recording and reproduction apparatus as claimed in claim 9, wherein said connection part has a flexible end portion bent in a U-shape at a location such that any deviation in position of said first and second positioning parts relative to one another causes said flexible end portion to deform to absorb the deviation.

11. The recording and reproduction apparatus as claimed in claim 10, wherein said flexible end portion is deformable, by a force applied in mounting said first and second parts on the base, so as to absorb a deviation of a position of said first support part relative to that of said second support part.

12. The recording and reproduction apparatus as claimed in claim 8, wherein each of said guide shaft support members comprises a restriction part for controlling the placement of the recording medium on a turntable upon which the recording medium is adapted to be rotated, said restriction part being formed integrally with each of said guide shaft support members.

13. The recording and reproducing apparatus as claimed in claim 8, wherein the first and second engagement members of each of said guide shaft support members are formed to protrude therefrom.

* * * * *